(12) United States Patent  
Tardif

(10) Patent No.: US 7,016,419 B2
(45) Date of Patent: Mar. 21, 2006

(54) SYSTEMS FOR MPEG SUBSAMPLE DECODING

(75) Inventor: John A. Tardif, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 56 days.

(21) Appl. No.: 10/856,604

(22) Filed: May 28, 2004

(65) Prior Publication Data

US 2004/0218678 A1 Nov. 4, 2004

Related U.S. Application Data

(60) Division of application No. 09/870,300, filed on May 30, 2001, now Pat. No. 6,885,707, which is a continuation of application No. 09/840,531, filed on Apr. 23, 2001, now Pat. No. 6,850,571.

(51) Int. Cl.
 *H04B 1/66* (2006.01)
(52) U.S. Cl. ............... 375/240.25; 375/240.21; 375/240.16; 375/240.26; 375/240.17; 348/699; 382/233; 382/238; 382/235; 382/236
(58) Field of Classification Search ........... 375/240.25, 375/240.21, 240.16, 240.12, 240.26, 240.17; 348/699; 382/233, 235, 238, 236

See application file for complete search history.

(56) References Cited

U.S. PATENT DOCUMENTS 5,262,854 A * 11/1993 Ng ..................... 375/240.24
5,828,421 A * 10/1998 Boyce et al. ............... 348/565

* cited by examiner

*Primary Examiner*—Shawn S. An
(74) *Attorney, Agent, or Firm*—Workman Nydegger

(57) ABSTRACT

Decimating MPEG or other video data by subsampling the output of an inverse discrete cosine transform (IDCT) module. The decimation process is useful for reducing the volume of data that must be processed to display images on a display device, particularly when the volume of video data received at the decoder is greater than the amount needed to take advantage of the resolution of the display device. For example, high definition television data can be decimated for display on a standard television display device or in a picture-in-picture window, thereby reducing the amount of processing resources needed at the decoder and reducing the size of the frame buffers. Subsampling the output of the IDCT module reduces the volume of data and, for relatively static or constant pans, there is not a significant compounded loss of image quality as successive frames are decoded.

7 Claims, 8 Drawing Sheets

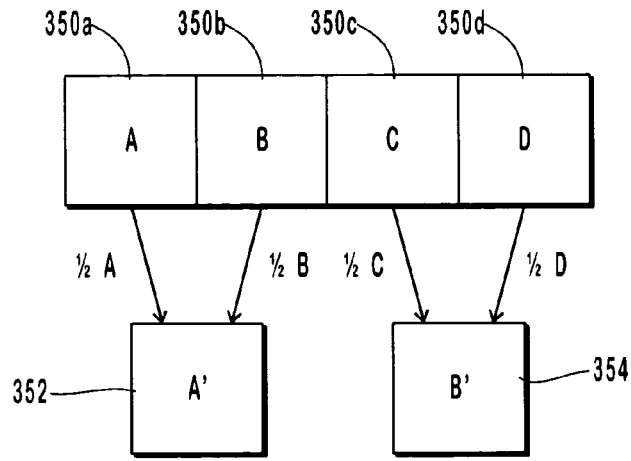
FIG. 5A
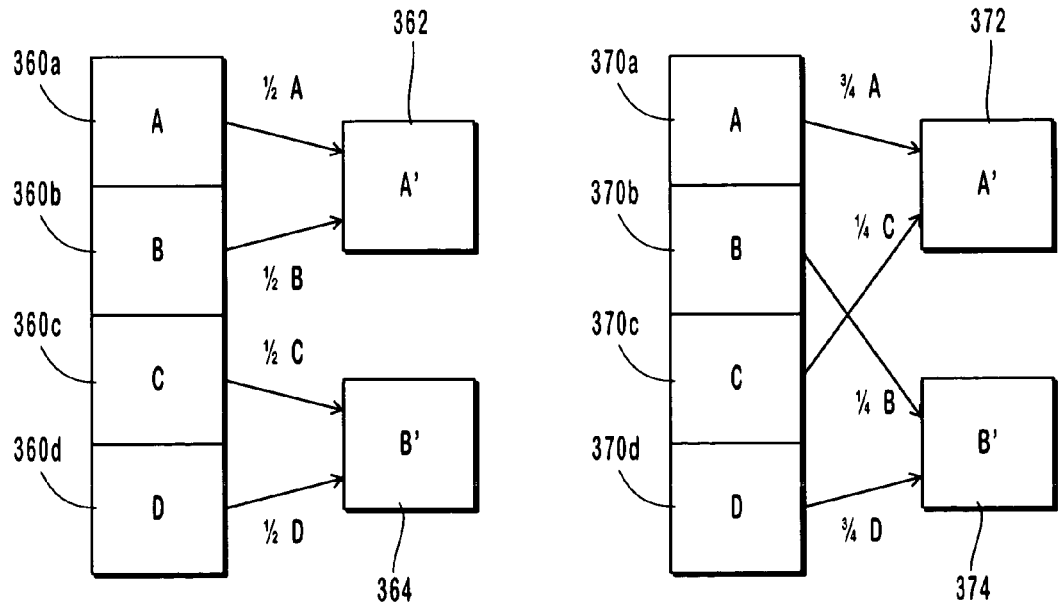
FIG. 5B
FIG. 5C

SYSTEMS FOR MPEG SUBSAMPLE DECODING

CROSS-REFERENCE TO RELATED APPLICATIONS

The present application is a divisional application of U.S. patent application Ser. No. 09/870,300, filed May 30, 2001 now U.S. Pat. No. 6,885,707, entitled, "Systems and Methods for MPEG Subsample Decoding," which is a continuation application of U.S. patent application Ser. No. 09/840, 531, filed Apr. 23, 2001 now U.S. Pat. No. 6,850,571, entitled, "Systems and Methods for MPEG Subsample Decoding," which are incorporated herein by reference.

BACKGROUND OF THE INVENTION

1. The Field of the Invention

The present invention relates to the field of digital video. More specifically, the present invention relates to reducing the memory bandwidth and memory footprint needed to decode and display MPEG video streams.

2. The Relevant Technology

High Definition Television ("HDTV") is a type of television that provides much better resolution than televisions based on National Television Systems Committee ("NTSC") standard. Although there are a number of competing HDTV standards, all standards support a wider screen than NTSC and roughly twice the resolution. Sending uncompressed analog HDTV data requires a bandwidth of about 18 Mhz. However, current terrestrial channel allocations are limited to 6 Mhz. As a result, HDTV video frames are digitized and then compressed before they are transmitted and then decompressed when they reach a receiving device, such as an HDTV television.

One widely used compression method is based on the Moving Pictures Experts Group standard and is commonly referred to as MPEG. MPEG employs interframe encoding, which means some of the frames are used as reference frames for other frames in compressed video data. An MPEG video bit stream includes I-frames, P-frames and B-frames. I-frames and P-frames can be used as a reference for other frames, hence they are known collectively as reference frames. I-frames or "Intraframes," are independent frames that may be encoded and decoded independently without referring to any other frames in the MPEG video bit stream. P-frames, or "Predictive" frames, are encoded and decoded using the previous reference frame, be it an I-frame or a P-frame. B-frames, or "Bi-directionally predictive" frames, are reproduced using reference frames that are the closest temporally previous to and/or subsequent to the B-frame. Since I-frames do not reference other frames for information, I-frames are typically substantially larger in size than P-frames and B-frames.

An MPEG video frame having the YUV420 format includes regions designated as macroblocks having a size of 16 pixels by 16 lines. Within each macroblock, there are six 8×8 blocks of data, four for luminance components, and two for subsampled chrominance data.

As shown in FIG. 1a, an MPEG encoding system, such as MPEG encoder 100, receives video data 104, which is a sequence of video images. MPEG encoder 100 typically includes discrete cosine transform (DCT) module 101, motion vector generation module 102 and a picture type determination module 103, which separate video data 104 into different requisite parts. DCT module 101 is used to transform blocks of the video data from the spatial domain into a frequency domain representation of the same blocks. Motion vector generation module 102 is used to generate motion vectors, which represent motion between macroblock regions in the frames of video data 104. Picture type determination module 103 determines which frames should be used as reference frames (I-frames). After being encoded, MPEG video bit stream 105 includes frequency coefficients 106, motion vectors 107, and header information 108, which specifies size, picture coding type, etc.

To reconstruct the original sequence of video images, inverse operations are performed, as illustrated by MPEG decoder 110 in FIG. 1b. Frequency coefficients 106 are dequantized and passed though inverse discrete cosine transform (IDCT) module 111, thus converting them back into spatial domain representations. Motion vector module 112 uses header information 108 and motion vectors 107 to recreate the macroblocks of P-frames and B-frames. The outputs from IDCT module 111 and motion vector module 112 are then summed by summer 113 to generate reconstructed output 114. Reconstructed output 114 is a sequence of video images similar to video data 104 from FIG. 1a, and can be displayed on a display device.

HDTV video frames consist of 1088 lines, each having 1920 pixels, which results in approximately two million pixels per frame. As alluded to previously, since MPEG uses a YUV420 color space, one pixel is represented using 1.5 bytes. Thus a single HDTV frame uses 3 MB. Since two reference images are maintained in order to correctly decode B-frames, and double buffering is usually desired at the output of the MPEG decoder so that it can decode an image while the video output displays the previous image, this implies that 12 MB of storage are needed for the frames of video data generated by the MPEG decoding process and the associated reference buffers. Equivalently, a standard resolution, NTSC frame consists of 480 lines, each having 720 pixels, or approximately 350,000 pixels per frame. With the YUV420 format, this means that each NTSC frame uses about 520 KB of memory. As a result, the decoder and display device for processing and displaying NTSC video data encoded using MPEG requires about 2.1 MB of storage for the frames of video data generated by the MPEG decoding process and the associated reference buffers.

In North America and other regions, video frames are conventionally sent at the rate of thirty frames per second. The memory bandwidth needed to store the output video data is ~90 MB/sec for HDTV and ~15.5 MB/sec for standard resolution broadcasts. In addition, MPEG decoding requires that predictions be made from reference images. During periods of worst case predictions, up to 4 times that amount of bandwidth may need to be supported (depending on the memory subsystem).

Due to the large installed base of NTSC televisions, it may often be the case that a video image having been compressed using MPEG and formatted for display on a HDTV device may need to be displayed on a lower resolution NTSC television. It may also be the case that any such video images may need to be displayed in a lower resolution, such as when using picture-in-picture functionality of a television. A conventional method for supporting this application is to fully decode the transmitted images at their native resolution, then resample the transmitted images to the required display resolution. However, decoding an MPEG video bit stream having full HDTV formatting and then resampling to a lower resolution wastes memory resources and computational resources, since the receiving device cannot display the full resolution of the image. As a result, certain methods could be used to reduce the memory footprint, memory throughput and the processing requirements for this application. FIG. 1c and 1d illustrate methods that could be used to reduce the memory footprint, memory throughput and the processing requirements. It is noted that the following methods do not necessarily represent prior art with respect to the present invention, but are presented herein to illustrate the advantages of the present invention compared to other approaches that could be implemented.

One class of methods involves modifications to the video data before transmission, such resampling to the desired display resolution or hierarchical encoding. All these methods can produce very good image quality. However, they are all limited in that they cannot support any and all desired output resolutions simultaneously in a broadcast environment, since the processing is performed prior to transmission, rather than at the decoding or display devices where the images are to be displayed. Also, most of these methods would involve non-standard profiles of MPEG video compression.

Another class of methods uses algorithms that are executed on the receiver. These methods attempt to reduce the size of the decompressed video images and the associated reference buffers. These reductions in size have an effect of reducing memory footprint for the buffers, reducing memory bandwidth for processing the decompressed video images, and reducing image resampling computational requirements. Most of these algorithms entail reducing the number of samples in frames in the horizontal and vertical directions by a factor of $2^N$, where N is normally 1.

One method, as shown in FIG. 1c, involves resampling the video frame after the frame has been decompressed using MPEG decoder 110 and prior to storing the decompressed frame in memory. This method can reduce memory footprint by a factor of four if the video frame is subsampled by a factor of two in the horizontal and vertical directions. This involves subsampling motion vectors 107 by a factor of two, then upsampling fetched motion reconstruction data 115 by factor of two in the horizontal and vertical directions. In a parallel operation, frequency coefficients 106 are dequantized and passed through IDCT module 111, which converts the coefficients back into spatial domain data 116. Spatial domain data 116 and the upsampled fetched motion reconstruction data 115 are then summed by summer 113. The output of summer 113 is then subsampled by a factor of two in each direction. This method is hindered by the fact that the output subsampling may require some extra buffering in order to allowing vertical filtering. Also, for relatively static scenes or constant pans, the error terms coming from the IDCT are nearly zero, which results in effectively the same image data being upsampled and downsampled many generations. This generational loss progressively degrades the image quality until an I-frame is decoded, in which case the image is refreshed. This results in a "beating" effect that is most noticeable and irritating to the viewer.

Another conventional method, as shown in FIG. 1d, involves ignoring all high frequency coefficients and using a 4×4 IDCT instead of an 8×8 IDCT. Similar to the method in FIG. 1c, motion vectors 107 are downsampled. However, fetched motion reconstruction data 115 may be directly summed with spatial domain data 116 without requiring post processing of the summed result, which reduces the effect of generational loss described above in reference to FIG. 1c. This method reduces memory footprint by a factor of four and significantly reduces the number of computations. However, simply ignoring the high frequency IDCT components can produce some significant artifacts at the boundaries of blocks and macroblocks in the decoded image (otherwise know as "block" artifacts). These artifacts in turn can significantly affect subsequent images that use the previous ones as references. Also, the 4×4 IDCT is slightly different from the 8×8 IDCT and for some hardware implementations is not easily changed.

In view of the foregoing, there exists a need for systems and methods for efficiently subsampling video data in preparation for displaying the video data on devices of lower resolution than what the video data was originally encoded for, thereby reducing the memory bandwidth and memory footprint needed to process the video data without appreciably reducing the quality of the output.

BRIEF SUMMARY OF THE INVENTION

The principles of the present invention provide for efficiently subsampling video data for display at a lower resolution than what the video data was originally encoded for. MPEG video bit streams are decoded by dequantizing frequency coefficients and passing them through an IDCT module to convert the coefficients back into the spatial domain representations, passing header information and motion vectors through a motion vector prediction module to fetch predictions from previously decoded images, and then summing the spatial domain representations and the fetched prediction data. The present invention performs decimation on the output of the IDCT module before it is summed with the results of the prediction module. Using this method, predictive and bi-directionally predictive frames do not significantly degrade beyond any initial blurring or softening associated with corresponding reference frames, particularly where the video frames represent relatively static images or constant pans.

Decimation by any factor may be performed in both the horizontal and vertical directions to generate various reductions in the memory bandwidth and footprint needed for image processing. For instance, one-dimensional subsampling by a factor of two, performed in the horizontal direction, yields a two-fold reduction in the memory bandwidth and footprint needed for image processing. Two-dimensional subsampling, or subsampling in both the horizontal and vertical directions, yields a four-fold reduction. Two-dimensional subsampling is most useful in frame-based video data, although it can also be used in field-interlaced video data.

Subsampling the output of the IDCT reduces the need for the IDCT to perform additional computations, yet the reconstructed output maintains much of the image quality associated with reference frames. Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5a illustrates a technique for subsampling video data in the horizontal direction according to one embodiment of the invention.

FIG. 5b illustrates a technique for subsampling non-interlaced video data in the vertical direction according to one embodiment of the invention.

FIG. 5c illustrates a technique for subsampling interlaced video data in the vertical direction according to one embodiment of the invention.

DETAILED DESCRIPTION OF THE PREFERRED EMBODIMENTS

The present invention extends to both methods and systems for subsampling and displaying video images that have been encoded using an HDTV format and in an MPEG video bit stream on a device of lower resolution, such as standard television, or on a picture-in-picture display. The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Figure 2:
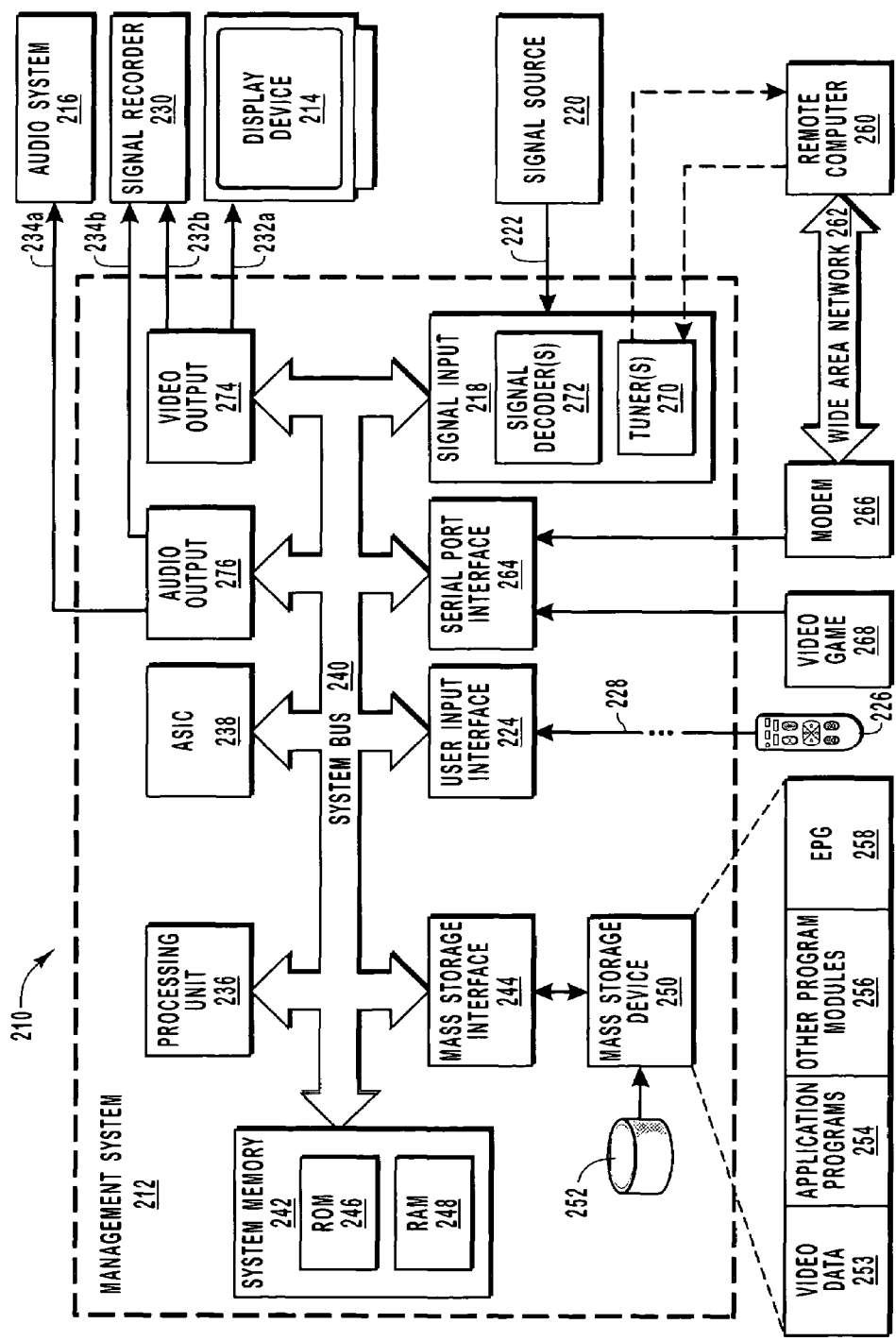
FIG. 2 illustrates an exemplary system that provides a suitable operating environment for the present invention.

FIG. 2 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

FIG. 2 illustrates a home entertainment system 210 that includes a management system 212, a display device 214 and an audio system 216. Management system 214 may be a set-top box or Internet terminal that has been adapted to perform the operations disclosed herein. Management system 212 may be integrally positioned with or separate from display device 214, which may be a high definition television display, a standard television display, a flat panel display, a projection device, a high definition television display, a computer monitor, or any other device capable of displaying viewable video image data. Audio system 216 may be a speaker, a stereo system, or any device capable of emitting sound data, and similarly may be integrally positioned with or separate from display device 214.

Management system 212 includes a signal input 218, which receives programming from a signal source 220. The programming is transmitted from signal source 220 to signal input 218 via a programming input line 222, which can be a cable or optic connection, a terrestrial antenna system, a satellite system, or any device or system capable of transmitting programming to home management system 212.

The signal source 220 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 2 illustrates home entertainment system 210 as having a single programming input line 222 and a single signal source 220, there can instead be a plurality of programming input lines that transmit programming from a plurality of signal sources. In such embodiments, the home entertainment system may receive the programming from one signal source or from a plurality of signal sources at a time.

Management system 212 also includes a user input interface 224, which receives input from an input device 226, such as a remote control, keyboard, microphone, or any other device capable of generating electronic instructions for management system 212. Input device 226 is communicatively coupled to management system 212 over an input link 228 so as to enable such control. Input device 226 generates electronic instructions over input link 228 in response to preprogrammed data or in response to a viewer pressing buttons on input device 226. Input device 226 may also control Web browser software within management system 212 as when management system 212 is a set-top box or an Internet terminal that has been adapted to perform the operations disclosed herein. For instance, input device 226 may be programmed to turn on home entertainment system 210 and to tune management system 212 to a channel.

FIG. 2 illustrates a signal recorder 230, which is capable of receiving video and/or audio data and recording the data on a storage medium. Video signals are transmitted to signal recorder 230 and/or display device 214 by video image link 232, examples of which include a radio-frequency ("RF") link, an S-video link, a composite link, or any other equivalent form of video image link. Similarly, audio link 234 transmits audio data from management system 212 to audio system 216 or to signal recorder 230.

The operation of management system 212 is controlled by a central processing unit ("CPU"), illustrated as processing unit 236, which is coupled to an application-specific integrated circuit ("ASIC") 238 and uses computer-executable instructions implemented in software and/or hardwired logic circuitry. Processing unit 236 and ASIC 238 are coupled via a system bus 240, which also interconnects various other system components, such as the system memory 242, mass storage interface 244, user interface 224 and signal input 218. Processing unit 236 executes software designed to implement features of management system 212 including features of the present invention. ASIC 238 contains circuitry that is used to implement certain functions of management system 212. Instructions, data, and other software necessary for the operation of processing unit 236 and ASIC 238 may be stored in the system memory 242, such as in read-only memory ("ROM") 246 and/or in random-access memory ("RAM") 248, and/or in a mass storage device 250, which is coupled to mass storage interface 244. ROM 246, RAM 248 and mass storage device 250 are communicatively coupled to ASIC 238 so as to be readable by ASIC 238 and so that data may be written from ASIC 238 to RAM 248 and possibly mass storage device 250.

Mass storage device 250 may be a magnetic hard disk 252 or any other magnetic or optical mass memory device that is capable of storing large amounts of data. Any desired computer-readable instructions or data, including application programs 254, other program modules 256, and an electronic programming guide ("EPG") 258, which specifies the broadcast times and channels of programs can be stored in mass storage device 250. Mass storage device 250 can also be used to record video data 253, in which case, management system 212 generates as a digital video recorder.

In the embodiment where management system 212 is associated with the Internet, management system 212 communicates with a remote computer 260 via a wide area network ("WAN") 262 by including a serial port interface 264 that is interposed between the system bus 240 and a modem 266, a wireless link, or other means for establishing communications over a WAN that may be internal or external to management system 212. Management device 212 is also capable of transmitting information via the Internet by direct-dial communication over standard telephone lines, or by using any other available communication medium.

While serial port interface 264 may be utilized to connect a modem 266 for communicating across a WAN, serial port interface may also be utilized to connect other consumer electronic devices, such as video game 268, and/or various input devices, such as a keyboard (not shown) or joystick (not shown), to management device 212.

Referring now to signal input 218, if the signal on programming input line 222 includes multiple channels, a tuner 270 included in signal input 218 tunes to a selected channel in the signal. Multiple tuners 270 can be used to provide enhanced viewing features, such as picture, recording one channel while viewing another, and recording a plurality of channels simultaneously. Video decoder 272 decodes video data from a compressed video format (e.g. MPEG) and performs the subsampling operations described herein. In embodiments where the management system 212 includes multiple tuners 270, management system 212 may also include multiple signal decoders 272 to perform the operations disclosed herein, which enable the image displayed on display device 214 to have a picture-in-picture, split-screen, or other multiple-window format.

Management system 212 also includes a video output 274, which may include a video encoder and/or a video converter. The video encoder assigns a code to frames of video data that are transmitted across a video image link 232 and switches between analog and digital formats as necessary. Similarly, audio output 276 can include an audio converter to provide the necessary switching between analog and digital formats.

Figure 3:
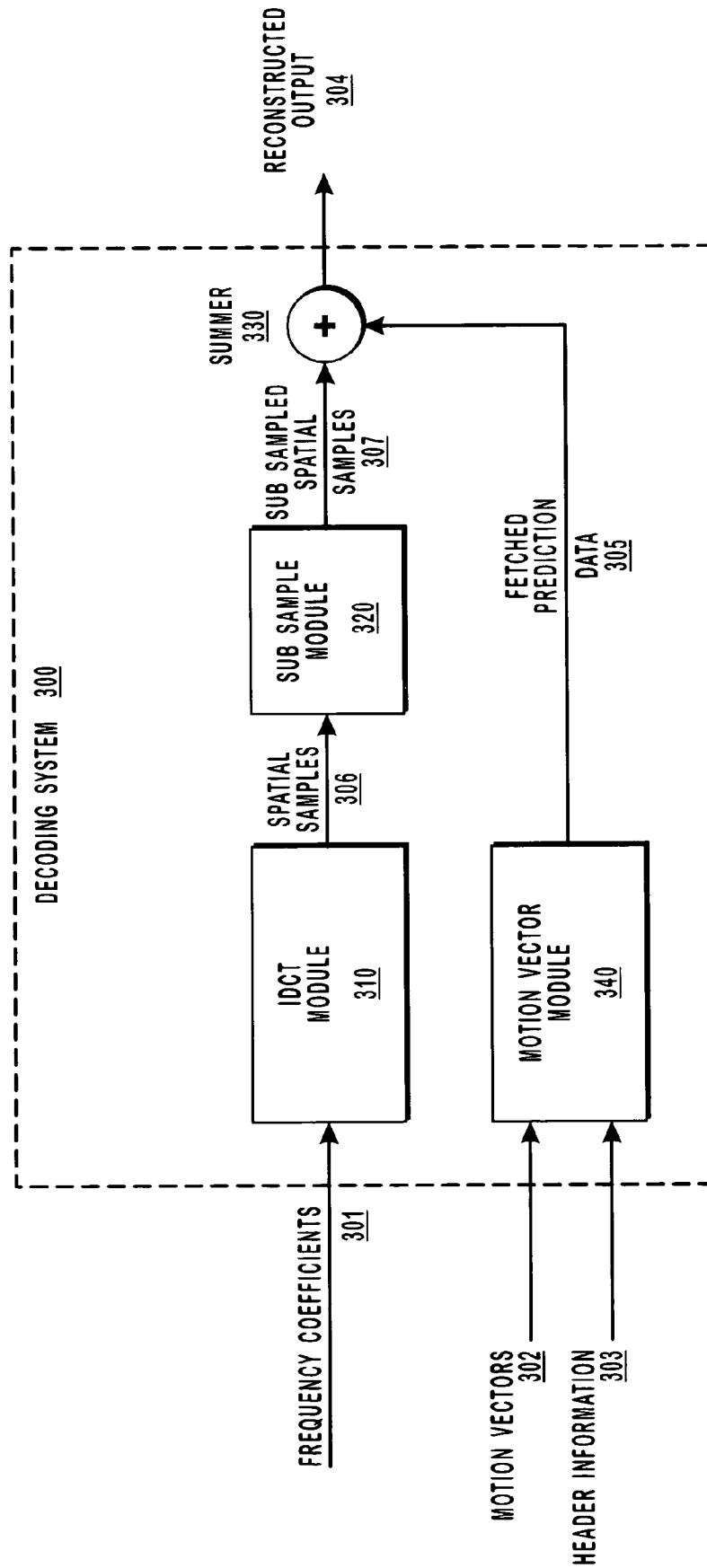
FIG. 3 illustrates a system of the invention that can reduce the memory bandwidth and footprint needed to display video images that have been encoded in an MPEG video bit stream and with an HDTV format on a device of lower resolution.

While FIG. 2 and the corresponding discussion above provide a general description of a suitable environment in which the invention may be implemented, it will be appreciated that the features of the present invention disclosed herein may be practiced in association with a variety of different system configurations. This is true of the functional components included in FIG. 3 as well. The functional components included in FIG. 3 illustrate only one example of the practice of the invention. It should be understood that the invention, as embodied in FIG. 3, might also be practiced in a configuration that additionally includes one or more of the components as illustrated in FIG. 2.

As illustrated in FIG. 3, the components of an MPEG video bit stream, including frequency coefficients 301, motion vectors 302, and header information 303, are input to decoding system 300. IDCT module 310, subsample module 320, summer 330, and motion vector module 340 are included as components of decoding system 300. IDCT module 310 includes an inverse discrete cosine transform, which converts dequantized frequency coefficients 301 into spatial samples 306. Motion vector module 340 uses header information 303 and motion vectors 302 to retrieve fetched prediction data 305, which is information from previously decoded images. Subsample module 320 subsamples spatial samples 306 by a selected subsampling factor. Summer 330 sums subsampled spatial samples 307 and fetched prediction data 305 to generate reconstructed output 304, which includes a sequence of video images that have a size smaller than the size of the corresponding video images that were originally encoded. The sequence of video images can then be displayed using an NTSC or other standard definition television ("SDTV") display device, using picture-in-picture, or otherwise processed or displayed as desired.

IDCT module 310, subsample module 320, summer 330 and motion vector module 340 may be software components, hardware components, or a combination of software and hardware. Although these modules are shown as separate modules, one or more of their functions may be combined in the components of FIG. 2, including signal input 218, processing unit 236, system memory 242, tuner(s) 270, signal decoder 272, video output 274, audio output 276, ASIC 238 or any combination thereof so as to be inseparably integrated. These modules may also be stored on mass storage device 250 and included in applications programs 254 or other program modules 256.

In operation, IDCT module 310 receives frequency coefficients 301 in parallel with motion vector module 340 receiving motion vectors 302 and header information 303. IDCT module 310 converts frequency coefficients 301 into spatial samples 306. While an inverse discrete cosine transform is frequently used to convert between the frequency and spatial domains, practice of the invention is not limited to this method of conversion. The invention may be practiced using any component that converts a frequency domain representation of data to a spatial domain representation of the same data, including methods using Fourier transforms.

Subsample module 320 subsamples spatial samples 306 to reduce the amount of data. Subsampling may be performed in any number of ways. One method is to subsample in only one direction, either horizontally or vertically. Subsampling in one direction results in a reduction in the data sent to summer 330 equal to the inverse of the subsampling rate. For example, subsampling by a factor of two, in the horizontal or vertical direction, results in sampling every other value in spatial samples 306 in the selected direction, which reduces the data sent to summer 330 to one half its value prior to being processed by subsample module 320.

Subsampling may also be performed in both the horizontal and vertical directions simultaneously. Subsampling in two directions results in a reduction in the data sent to summer 330 equal to the inverse of the product of the subsampling rate in the horizontal direction times the subsampling rate in the vertical direction. Subsampling by a factor of two in the horizontal and vertical directions simultaneously results in sampling every other value in spatial samples 306 in both the horizontal and vertical directions. This reduces the data sent to summer 330 to one fourth its value prior to being processed by subsample module 320.

FIGS. 5a–5c illustrate various techniques for subsampling spatial samples and applying appropriate weighting factors to the spatial samples according to selected embodiments of the invention. It is noted that the following subsampling techniques represent only a few of the large number of subsampling algorithms and processes that can be used with the invention to decimate video data. One basic principle illustrated by the following subsampling techniques is that spatial samples having been generated by the IDCT are selected and weighted to generate the subsampled spatial samples.

FIG. 5a illustrates a process for decimating spatial samples in the horizontal direction by a factor of two. Spatial samples A–D 350a–d represent blocks in a macroblock of a frame of MPEG video data and have a color parameter, either a luminance or chrominance. Spatial samples A–D 350a–d are subsampled by a factor of two to generate subsample A' 352 and subsample B' 354. The color parameters specified by sample A 350a and sample B 350b are combined in order to generate one subsample A' 352 from the two spatial samples. In order to preserve the spatial positioning of sample A 350a and sample B 350b, the color parameters are weighted by a factor inversely proportional to the relative spatial distance from the samples to the subsample in this example. In this case, the relative spatial distances of sample A 350a and sample B 350b to subsample A' 352 are equal. Accordingly, the color parameters are multiplied by the same factor, namely, ½. Thus, the color parameter of subsample A' 352 is generated using the equation A'=½ A+½ B, where A' represents the color parameter of subsample A' 352 and A and B represent the color parameters of sample A 350a and sample B 350b, respectively. Similarly, the color parameter of subsample B' 354 is generated using the equation B'=½ C+½ D.

FIG. 5b illustrates a process for decimating spatial samples of non-interlaced video data in the vertical direction by a factor of two. Spatial samples A–D 360a–d represent spatial samples in successive rows of the non-interlaced video data. The process of obtaining the color parameters of subsample A' 362 from sample A 360a and sample B 360b and of subsample B' 364 from sample C 360c and sample D 360d is similar to the horizontal decimation process described above in reference to FIG. 5b.

FIG. 5c illustrates a process of decimating spatial samples of field-interlaced video data in the vertical direction by a factor of two. Spatial sample A 370a and spatial sample C 370c represent samples in successive rows of a first field of the frame of video data, while spatial sample B 370b and spatial sample D 370d represent samples in successive rows of a second field. In this example, the samples of the successive rows are used to generate the corresponding subsample. In order to preserve the spatial positioning of sample A 370a and sample C 370c, the color parameters are weighted by a factor inversely proportional to the relative spatial distance from the samples to the subsample in this example. In this case, the relative spatial distance of sample A 370a to subsample A' 372 with respect to the spatial distance of sample C 370c to subsample A' 372 is 1:3. Accordingly, the color parameter of sample A 370a is multiplied by a factor that is inversely proportional to the ratio 1:3, namely, ¾. Similarly, the color parameter of sample C 370c is multiplied by a factor that is inversely proportional to its relative distance to subsample A' 372, namely, ¼. Thus, the color parameter of subsample A' 372 is generated using the equation A'=¾ A+¼ C, where A' represents the color parameter of subsample A' 372 and A and C represent the color parameters of sample A 370a and sample C 370c, respectively. Similarly, the color parameter of subsample B' 374 is generated using the equation B'=¼ B+¾ D.

The foregoing techniques can be combined to decimate in both the horizontal and vertical directions. Although the foregoing subsampling techniques can be used advantageously with the invention, the specific algorithms for subsampling are not critical to the invention. Moreover, other weighting factors can be used to filter the spatial samples as desired.

Motion vector module 340 combines data from motion vectors 302 and header information 303 to generate fetched prediction data 305. Data stored in motion vectors 302 is used to modify header information 303 to generate predictive and bi-directionally predictive frames. Motion vector module 340 decimates, scales, or otherwise adjusts motion vectors 302 by the same factor as the subsampling factor used by subsample module 320, so that the adjusted motion vectors can be used to fetch, from a reference frame, prediction data 305 that corresponds with the subsampled spatial samples 307. For instance, if subsample module 320 subsamples in the horizontal direction by a factor of two, motion vector module 340 decimates the motion vectors in the horizontal direction by a factor of two. Similarly, if subsample module 320 subsamples in both the horizontal and vertical directions, motion vector module 340 decimates motion vectors 302 by the same factors in the horizontal and vertical directions. Summer 330 sums subsampled spatial samples 307 and fetched prediction data 305 to form reconstructed output 304.

Figure 4:
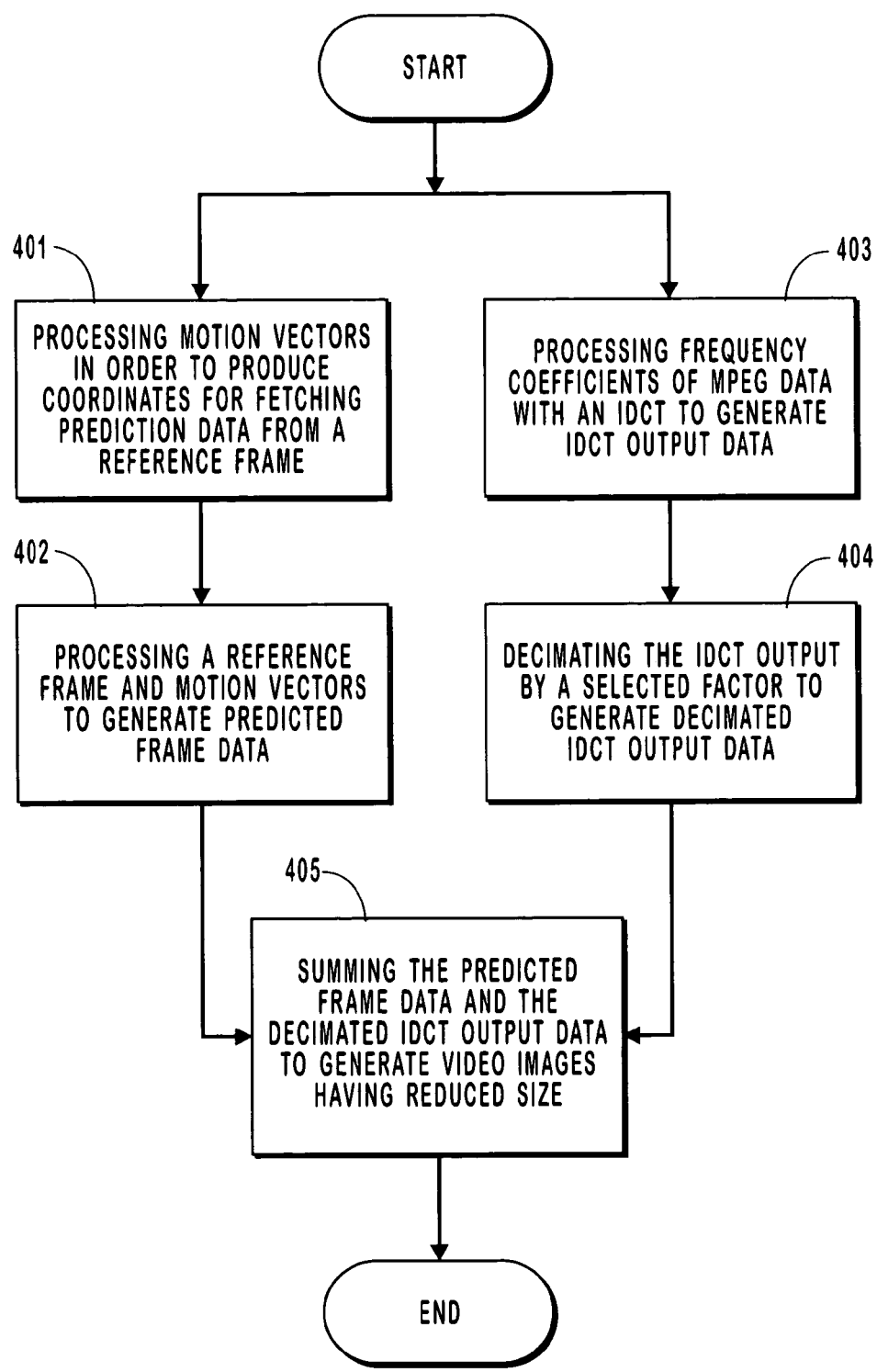
FIG. 4 is a flow diagram illustrating a method for decoding and subsampling the MPEG video bit stream using the system of FIG. 3.

The operation of the structure of FIG. 3 will now be described with respect to FIG. 4, which is a flowchart of a method for subsampling and decoding an MPEG video bit stream. The method of this embodiment of the invention begins by performing, in parallel, an act of processing motion vectors in order to fetch prediction data from a reference frame (act 401) and an act of processing frequency coefficients of the MPEG video bit stream with an IDCT to generate IDCT output data (act 403). The method also includes an act of processing a reference frame and the decimated or otherwise adjusted motion vectors in a frame prediction module to generate predicted frame data (act 402) and an act of decimating the IDCT output data (act 404). The decimated IDCT output data and the predicted subsampled frame data are then summed to generate video images having reduced size (act 405).

By decimating the video data in the foregoing manner, an MPEG video bit stream having an HDTV format can be subsampled and decoded so as to obtain a sequence of video images having sizes such that the images can be rendered on an SDTV display device or in a picture-in-picture window. Subsampling, decoding and displaying the video data in this manner eliminates the need to decode and buffer the full volume of the original HDTV video data. For instance, if an HDTV MPEG video bit stream is received by the device that decodes the video data (e.g., management system 212) at a rate of 90 MB/sec, the processing capabilities of the decoder and the associated memory can be significantly smaller than that which has been required using prior art techniques. For instance, if the video data is subsampled by a factor of two in both the horizontal and vertical directions, the frame buffers used to temporarily store the frames of the video data prior to display on the display device can have a total storage capacity as small as 1.6 MB or smaller. Similarly, the internal data transmission rates at which the decoded video data is transmitted can be reduced by a factor of four using the two-dimensional decimation.

Because subsampling is performed after the frequency coefficients are processed by IDCT module 310, that is by subsampling spatial samples 306, the resolution of the decoded image data is typically reduced. However, because one useful implementation of the invention is to process video data for display on a display device or a region thereof having a resolution that is often significantly smaller than the resolution of the full volume of video data, this loss of image quality is often negligible. In addition, unlike many other decimation processes that may be technically feasible or which are known in the art, subsampling performed in the spatial domain does not result in a significant compounded loss of image quality for relatively static or constant pans.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computer program product for implementing, in a system for processing MPEG data in preparation for displaying video images encoded in the MPEG data, a method for subsampling the MPEG data to reduce the volume of video data processed to selectively display video images based on a reduced volume of video data, the computer program product comprising:

a computer-readable medium carrying computer executable instructions capable of causing the system to perform the acts of processing the MPEG data to generate a reconstructed digital video stream capable of producing video images in a first video resolution;

receiving a request for displaying video images having a second video resolution;

subsampling the MPEG data to obtain a reduced volume reconstructed digital video stream corresponding to the second video resolution that is less than the first video resolution, wherein the subsampled MPEG data is subsampled without generating a version of the subsampled data in the first video resolution, wherein subsampling includes decimating IDCT output data by a selected factor to generate decimated IDCT output data, and wherein decimating the IDCT output data includes weighting color parameters of at least first and second IDCT output data samples using at least first and second weighting factors, respectively, and summing the weighted color parameters; and selectively presenting either or both of the first and second reconstructed digital video streams.

2. The invention of claim 1 wherein the act of subsampling comprises:
  processing one or more motion vectors in order to produce coordinates for fetching prediction data from a previously decoded and subsampled reference frame;
  processing the reference frame and the one or more motion vectors of the MPEG data using a frame prediction module to generate predicted subsampled frame data;
  processing frequency coefficients of the MPEG data using an inverse discrete cosine transformer (IDCT) to generate the IDCT output data; and
  summing the subsampled predicted frame data and the decimated IDCT output data to generate video images encoded in a reduced volume of video data.

3. The invention as recited in claim 2, wherein the act of decimating the IDCT output by a selected factor comprises the act of decimating the IDCT output by a first factor in a first direction and a second factor in a second perpendicular direction, such that the IDCT output is decimated by the selected factor.

4. The invention as in claim 2, further comprising the act of identifying the selected factor, the selected factor being identified to reduce the volume of MPEG data that is to be processed to display the video images and to retain enough video data to display the video images at tile first video resolution.

5. The invention as in claim 2, wherein the MPEG data, prior to the act of decimating, is formatted for display on a display device with the first video resolution, the computer-executable instructions, when executed at the system, further causing the system to perform the act of displaying the generated video images on a display device having the second video resolution.

6. The computer program product as recited in claim 5, wherein:
  the display device having the first video resolution is a high definition television; and
  the display device having the second video resolution is a standard television.

7. The computer program product as recited in claim 2, wherein the computer-executable instructions, when executed at the system, further cause the system to perform the act of displaying the video images in a window in a picture-in-picture display, the window having the second video resolution.

* * * * *

UNITED STATES PATENT AND TRADEMARK OFFICE
CERTIFICATE OF CORRECTION

| | | |
|---|---|---|
| PATENT NO. | : 7,016,419 B2 | Page 1 of 1 |
| APPLICATION NO. | : 10/856604 | |
| DATED | : March 21, 2006 | |
| INVENTOR(S) | : John A. Tardif | |

Figure 1A:
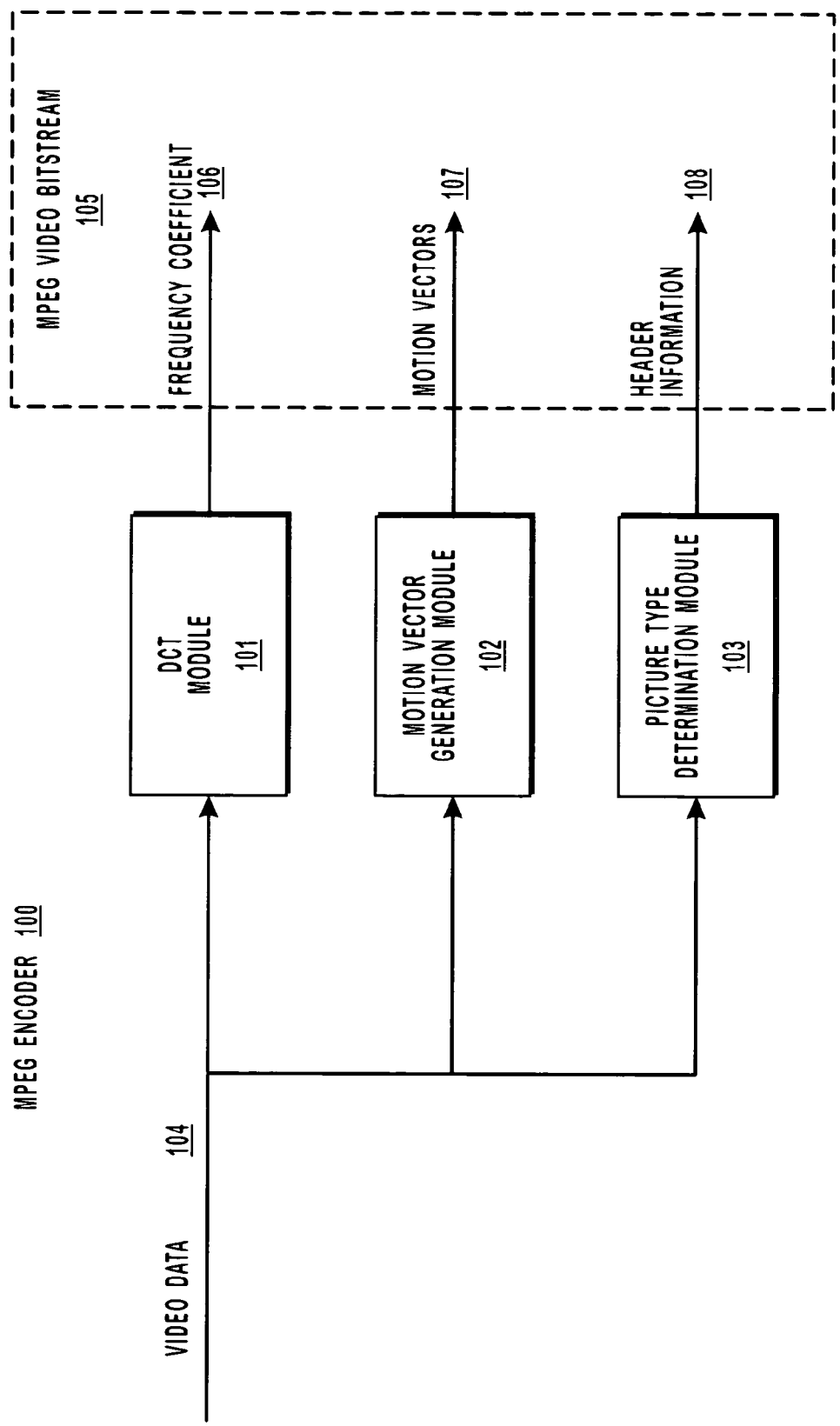
FIG. 1a illustrates a conventional system used to encode an MPEG video bit stream.
Figure 1B:
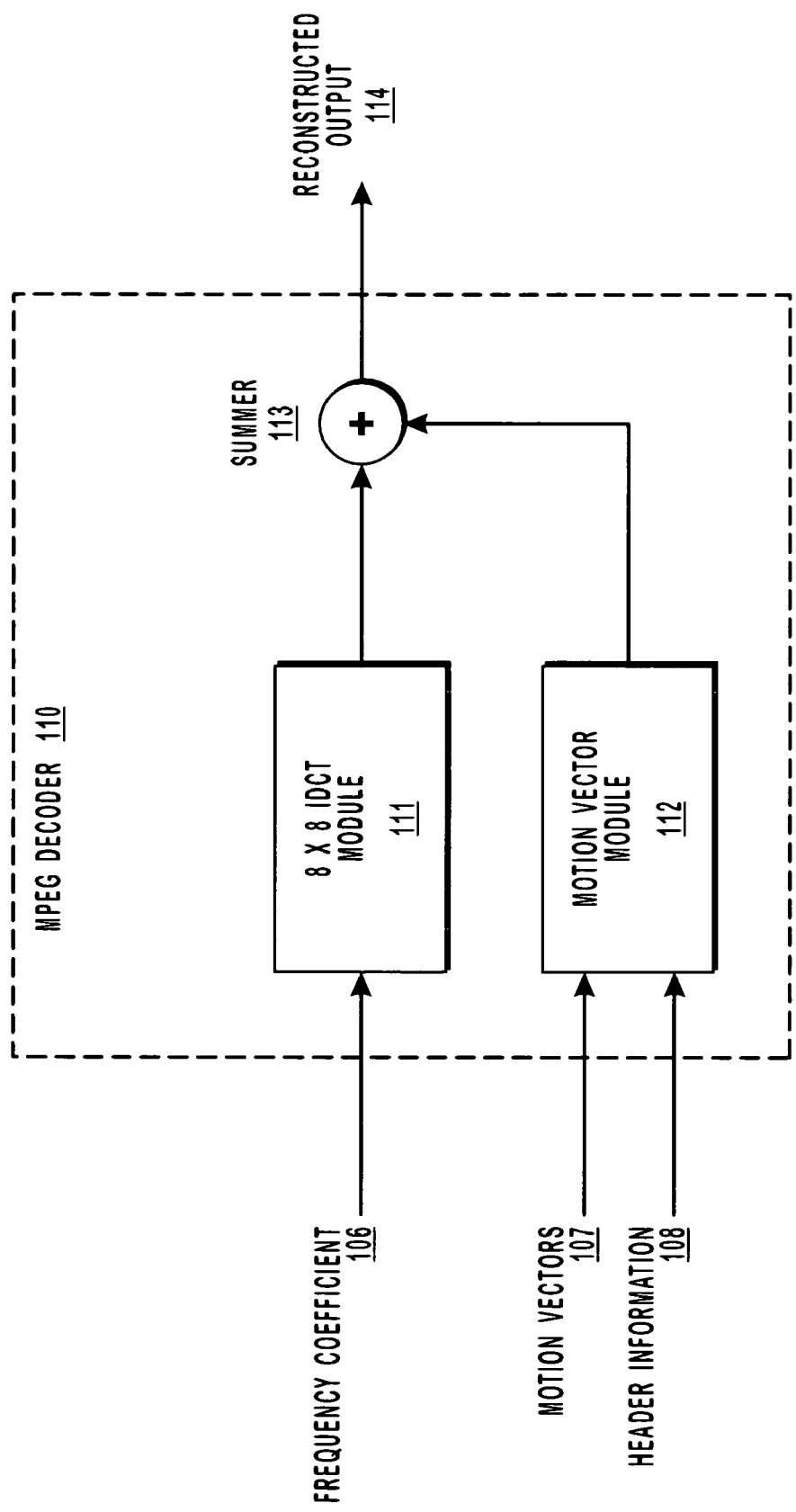
FIG. 1b illustrates a conventional system used to decode an MPEG video bit stream.
Figure 1C:
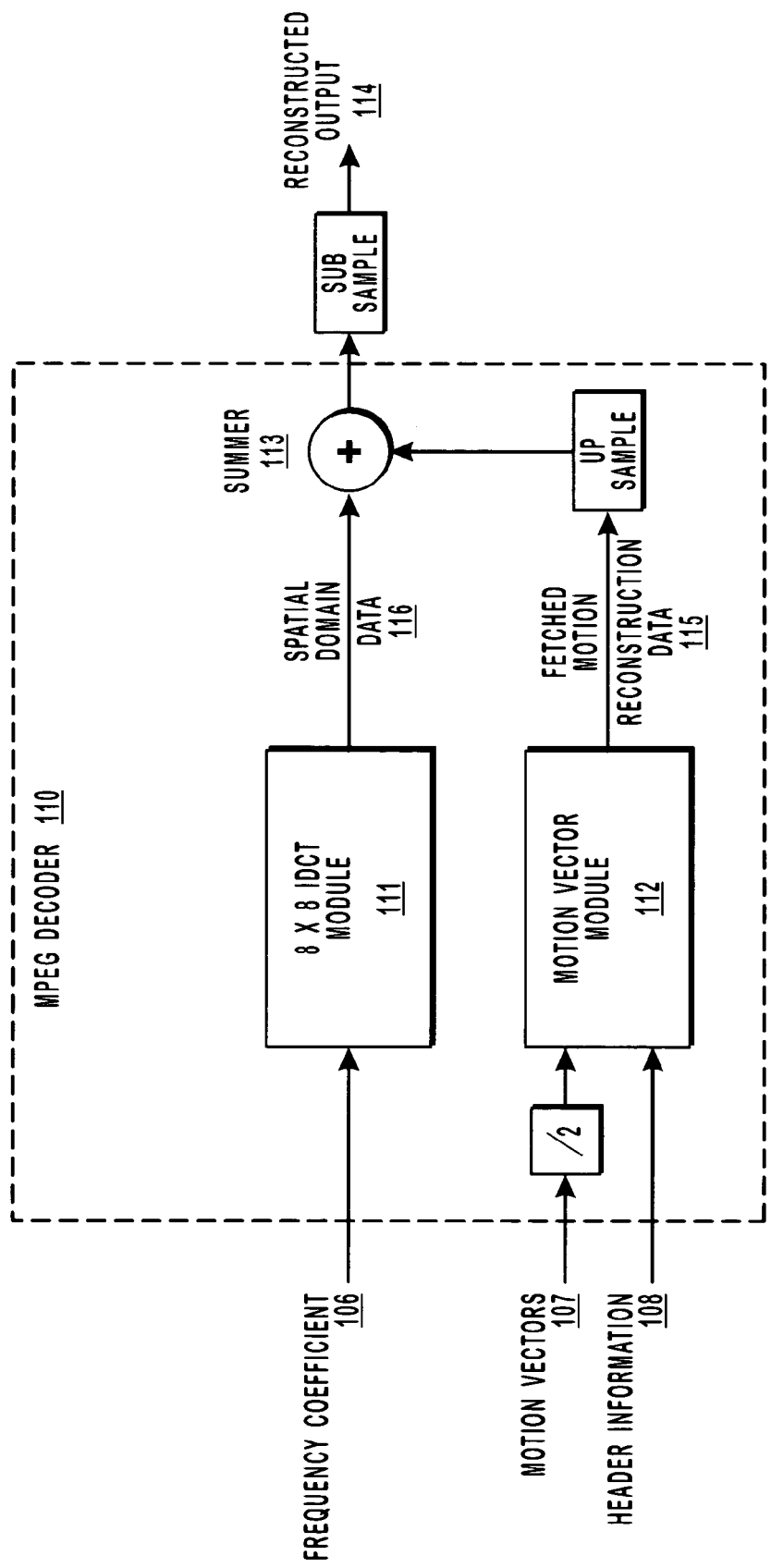
FIG. 1c illustrates a system for reducing the memory bandwidth and footprint needed to display video images that have been encoded in an MPEG video bit stream, which subsamples the reconstructed output of an MPEG decoder.
Figure 1D:
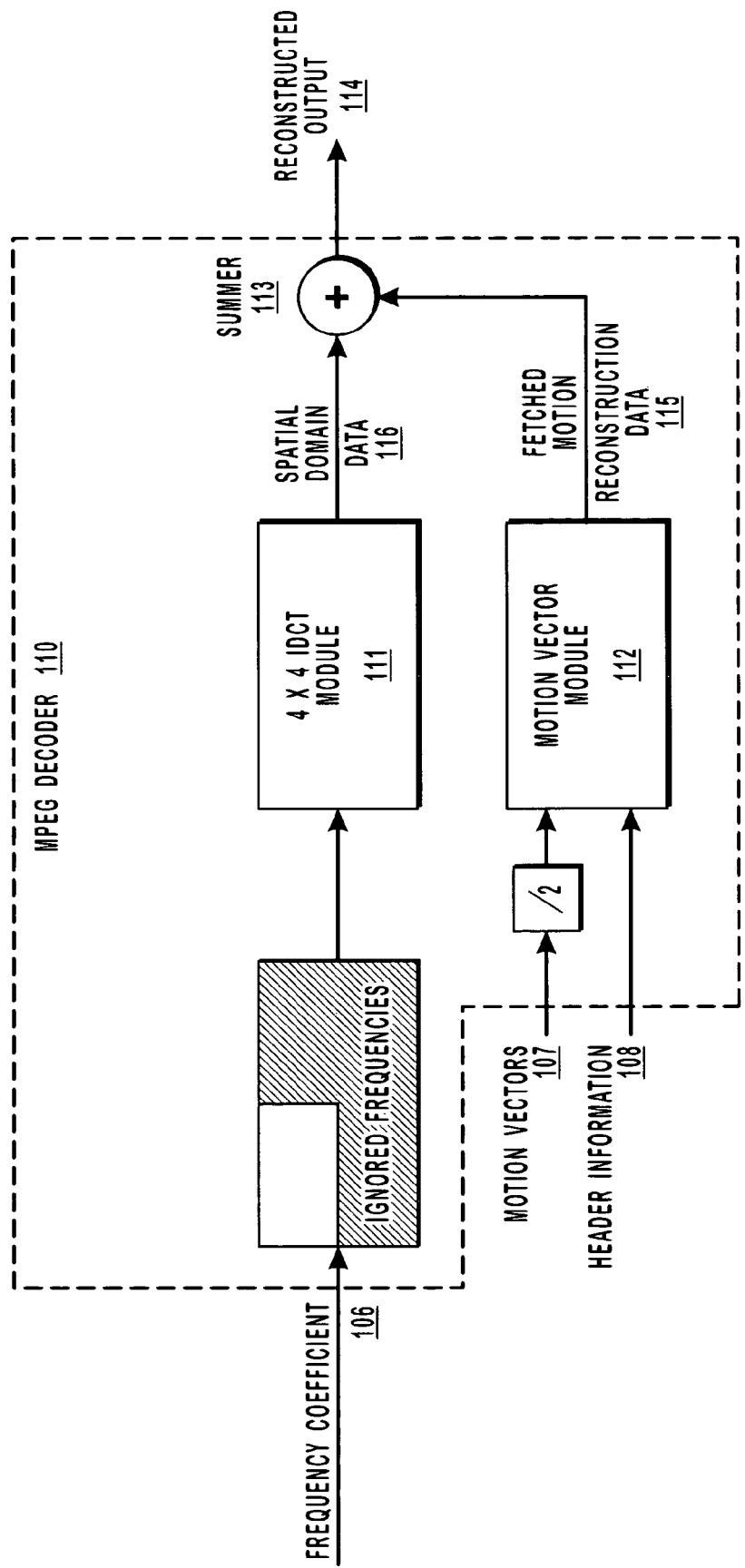
FIG. 1d illustrates a system for reducing the memory bandwidth and footprint needed to display video images that have been encoded in an MPEG video bit stream, which ignores some frequency coefficients included in the MPEG video bit stream.

It is certified that error appears in the above-identified patent and that said Letters Patent is hereby corrected as shown below:

In column 3, line(s) 1-2, delete "FIG. 1c and 1d" and insert -- Figures 1c and 1d --, therefor.

In column 14, line 2, in Claim 4, delete "tile" and insert -- the --, therefor.

Signed and Sealed this

Fourth Day of August, 2009

JOHN DOLL
*Acting Director of the United States Patent and Trademark Office*